US012808777B2

(12) United States Patent
Yoshida et al.

(10) Patent No.: US 12,808,777 B2
(45) Date of Patent: Nov. 24, 2026

(54) DROPLET SORTING SYSTEM, DROPLET SORTING METHOD, AND DROPLET SORTING PROGRAM

(71) Applicant: Sony Group Corporation, Tokyo (JP)

(72) Inventors: Hirotaka Yoshida, Tokyo (JP); Fumitaka Otsuka, Kanagawa (JP); Hiroyuki Suzuki, Kanagawa (JP); Masakazu Kobayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/863,054

(22) PCT Filed: Apr. 27, 2023

(86) PCT No.: PCT/JP2023/016651
§ 371 (c)(1),
(2) Date: Nov. 5, 2024

(87) PCT Pub. No.: WO2023/218986
PCT Pub. Date: Nov. 16, 2023

(65) Prior Publication Data

US 2025/0389637 A1 Dec. 25, 2025

(30) Foreign Application Priority Data

May 13, 2022 (JP) ................................ 2022-079209

(51) Int. Cl.
*G01N 15/1492* (2024.01)
*G01N 21/27* (2006.01)

(52) U.S. Cl.
CPC ......... *G01N 15/1492* (2024.01); *G01N 21/27* (2013.01)

(58) Field of Classification Search
CPC ............ G01N 15/149; G01N 15/1433; G01N 15/1459; G01N 15/1492; G01N 21/27; G01N 2015/1006
See application file for complete search history.

(56) References Cited

U.S. PATENT DOCUMENTS

2007/0195310 A1 8/2007 Kanda
2015/0068957 A1* 3/2015 Otsuka .............. G01N 15/1492 209/577

(Continued)

FOREIGN PATENT DOCUMENTS

JP 2009-145213 A 7/2009
JP 2016-057286 A 4/2016

(Continued)

OTHER PUBLICATIONS

English Translation of WO 2020149042 A1; Inv: Otsuka, Fumitaka; Pub. Date: Jul. 2020 (Year: 2020).*

(Continued)

*Primary Examiner* — Joseph C Rodriguez
(74) *Attorney, Agent, or Firm* — Wolf, Greenfield & Sacks, P.C.

(57) ABSTRACT

To provide a novel technique for stably forming droplets in a droplet sorting technique.
A droplet sorting system including a droplet imaging unit that images a state of a fluid stream including a droplet discharged from an orifice that generates the fluid stream, a vibration element for forming the droplet, and a control unit that specifies a control parameter of the vibration element on the basis of a state of a satellite in a fluid stream image including a droplet fused with the satellite captured by the droplet imaging unit is provided.

13 Claims, 13 Drawing Sheets

(56) References Cited

U.S. PATENT DOCUMENTS

| | | | | |
|---|---|---|---|---|
| 2017/0010203 | A1* | 1/2017 | Otsuka | B01L 3/502776 |
| 2017/0241889 | A1* | 8/2017 | Otsuka | G01N 15/1404 |
| 2018/0292304 | A1* | 10/2018 | Otsuka | G01N 15/1436 |
| 2021/0039111 | A1* | 2/2021 | Kanda | B03C 3/38 |
| 2022/0091015 | A1* | 3/2022 | Otsuka | G01N 15/1459 |
| 2023/0273108 | A1* | 8/2023 | Masuhara | G01N 15/1434 |

FOREIGN PATENT DOCUMENTS

| | | | |
|---|---|---|---|
| JP | 2017-122734 | A | 7/2017 |
| JP | 2021-025866 | A | 2/2021 |
| WO | WO 2005/106427 | A1 | 11/2005 |
| WO | WO 2020/149042 | A1 | 7/2020 |
| WO | WO 2022/024575 | A1 | 2/2022 |

OTHER PUBLICATIONS

International Search Report and English translation thereof mailed Jul. 18, 2023 in connection with International Application No. PCT/JP2023/016651.

* cited by examiner

DROPLET SORTING SYSTEM, DROPLET SORTING METHOD, AND DROPLET SORTING PROGRAM

CROSS-REFERENCE TO RELATED APPLICATIONS

This application claims the benefit under 35 U.S.C. § 371 as a U.S. National Stage Entry of International Application No. PCT/JP2023/016651, filed in the Japanese Patent Office as a Receiving Office on Apr. 27, 2023, which claims priority to Japanese Patent Application Number JP2022-079209, filed in the Japanese Patent Office on May 13, 2022, each of which is hereby incorporated by reference in its entirety.

TECHNICAL FIELD

The present technology relates to a droplet sorting system. More specifically, the present technology relates to a droplet sorting system, a droplet sorting method, and a droplet sorting program for optically detecting characteristics of droplets and sorting the droplets.

BACKGROUND ART

During these years, with the development of analytical methods, methods for individually detecting particles or the like or analyzing or sorting the detected particles or the like in a step of allowing biological microparticles such as cells and microorganisms, microparticles such as microbeads, or the like to flow through a flow channel are being developed.

As a representative example of such methods for analyzing or sorting particles, technical improvement of an analysis method called flow cytometry is rapidly progressing. Flow cytometry is an analytical method for analyzing or sorting particles to be analyzed by allowing the particles to flow in a fluid in a state of being aligned and radiating laser light or the like onto the particles to detect fluorescence or scattered light emitted from each particle.

For example, in a case of detecting fluorescence of a cell, a cell labeled with a fluorescent dye is irradiated with excitation light having an appropriate wavelength and intensity, such as laser light. Fluorescence emitted from the fluorescent dye is then condensed by a lens or the like, light in an appropriate wavelength range is selected using a wavelength selection element such as a filter or a dichroic mirror, and the selected light is detected using a light receiving element such as a photo multiplier tube (PMT). At this time, by combining a plurality of wavelength selection elements and light receiving elements, it is also possible to simultaneously detect and analyze fluorescence from a plurality of fluorescent dyes labeled on cells. Moreover, it is also possible to increase the number of fluorescent dyes that can be analyzed by combining excitation light of multiple wavelengths.

For fluorescence detection in flow cytometry, there is also a method for measuring intensity of light in a continuous wavelength range as a fluorescence spectrum in addition to a method for selecting light in a plurality of discontinuous wavelength ranges using wavelength selection elements such as filters and measuring intensity of light in each wavelength range. In spectral flow cytometry capable of measuring a fluorescence spectrum, fluorescence emitted from particles is dispersed using a spectroscopic element such as a prism or a grating. The dispersed fluorescence is then detected using a light receiving element array in which a plurality of light receiving elements having different detection wavelength ranges is arranged. As the light receiving element array, a PMT array or a photodiode array in which light receiving elements such as PMTs and photodiodes are arranged in one dimension, or a plurality of independent detection channels such as two-dimensional light receiving elements such as CCDs or CMOSs is used.

In an analysis of particles represented by flow cytometry or the like, an optical method for irradiating particles to be analyzed with light such as laser and detecting fluorescence or scattered light emitted from the particles is often used. A histogram is then extracted by an analysis computer and software on the basis of the detected optical information, and an analysis is performed.

For example, Patent Document 1 proposes a device for sorting biological particles contained in a liquid flow. The device includes an optical mechanism that irradiates each of the biological particles with light to detect light from the biological particle, a control unit that detects a movement speed of each of the biological particles in the liquid flow on the basis of the light from the biological particles, and a charging unit that imparts charge to each of the biological particles on the basis of the movement speed of the biological particle.

Furthermore, Patent Document 2 discloses a technique for stably forming a droplet by providing, for a droplet sorting device, a detection unit that detects states of droplets discharged from an orifice that generates a fluid stream and satellite droplets present between the droplets, and a control unit that controls a frequency of a drive voltage supplied to a vibration element that applies vibration to the orifice on the basis of positions in which the satellite droplets are present.

CITATION LIST

Patent Document

Patent Document 1: Japanese Patent Application Laid-Open No. 2009-145213

Patent Document 2: Japanese Patent Application Laid-Open No. 2016-057286

SUMMARY OF THE INVENTION

Problems to be Solved by the Invention

As described above, in a droplet sorting technique, a technique for stably forming droplets is being developed. As described in Patent Document 2, it is possible to detect states of satellite droplets and form stable droplets on the basis of the states, but satellite droplets are not necessarily present in actual droplet sorting, and further development of a technique for stably forming droplets has been desired.

A main object of the present technology, therefore, is to provide a novel technique for stably forming droplets in a droplet sorting technique.

Solutions to Problems

First, the present technology provides a droplet sorting system including

- a droplet imaging unit that images a state of a fluid stream including a droplet discharged from an orifice that generates the fluid stream,
- a vibration element for forming the droplet, and
- a control unit that specifies a control parameter of the vibration element on the basis of a state of a satellite in a fluid stream image including a droplet fused with the satellite captured by the droplet imaging unit.

In the droplet sorting system according to the present technology, the control parameter may be one or more parameters selected from frequency, amplitude, and intensity of a drive voltage of the vibration element. The droplet sorting system according to the present technology may further include a processing unit that separates a satellite portion and a droplet portion from each other in the fluid stream image.

In the control unit in the droplet sorting system according to the present technology, the control unit may specify the control parameter of the vibration element on the basis of the fluid stream image after the separation.

In the droplet sorting system according to the present technology, the separation may be performed on the basis of width information regarding the droplet.

In this case, the separation may be performed at a position having a specific width with respect to height of the droplet.

Furthermore, the separation may be performed at a position where width of the droplet is minimum or at a position where the width of the droplet is a specific width with respect to a maximum width.

In the droplet sorting system according to the present technology, the processing unit may perform a first determination for determining whether or not it is necessary to perform the separation on the basis of a preset threshold.

In a case where the first determination is performed, the threshold may be a threshold related to one or more selected from width, height, and a center of gravity of the droplet.

In the droplet sorting system according to the present technology, the processing unit may perform a second determination for determining whether or not the separation is possible on the basis of a state parameter of the droplet calculated from the fluid stream image captured by the droplet imaging unit.

In a case where the second determination is performed, the state parameter may be one or more state parameters selected from a ratio between width and height of the droplet, a position of a center of gravity with respect to the height of the droplet, and a position where the width of the droplet is a specific width with respect to the height of the droplet.

In the droplet sorting system according to the present technology, the processing unit may scan the fluid stream image from a downstream side and calculate a minimum value of the width of the droplet.

In the droplet sorting system according to the present technology, if the state parameter is within a predetermined range in the second determination, it may be determined that the separation is possible.

In this case, the fluid stream image may be scanned from an upstream side in the second determination, and if a position where the width of the droplet is minimum is within a predetermined range with respect to the height of the droplet, it may be determined that the separation is possible.

Furthermore, the fluid stream image may be scanned from a downstream side in the second determination, and if the position where the width of the droplet is the specific width with respect to a maximum width is within a predetermined range with respect to the height of the droplet, it may be determined that the separation is possible.

Next, the present technology provides a droplet sorting method including an imaging step of imaging a state of a fluid stream including a droplet discharged from an orifice that generates the fluid stream, a droplet forming step of forming the droplet using a vibration element, and a control step of specifying a control parameter of the vibration element on the basis of a state of a satellite in a fluid stream image fused with the satellite captured in the imaging step.

Moreover, the present technology provides a droplet sorting program for causing a computer to achieve a control function of specifying, on the basis of a state of a satellite discharged from an orifice that generates a fluid stream including a droplet fused with the satellite, a control parameter of a vibration element for forming the droplet in a fluid stream image including a state of the fluid stream.

MODE FOR CARRYING OUT THE INVENTION

Preferred modes for carrying out the present technology will be described hereinafter with reference to the drawings. Embodiments described below illustrate examples of representative embodiments of the present technology, and the scope of the present technology is not narrowly interpreted by these. Note that the description is given in the following order.

1. Droplet Sorting System 1
(1) Flow Path P
(2) Light Radiation Unit 104
(3) Detection Unit 105
(4) Vibration Element V
(5) Droplet Imaging Unit 101
(6) Control Unit 102
(7) Processing Unit 103
(8) Sorting Unit 106
(9) Storage Unit 107
(10) Display Unit 108
(11) User Interface 109
2. Droplet Sorting Method
3. Droplet Sorting Program 1. Droplet Sorting System 1

Figure 1:
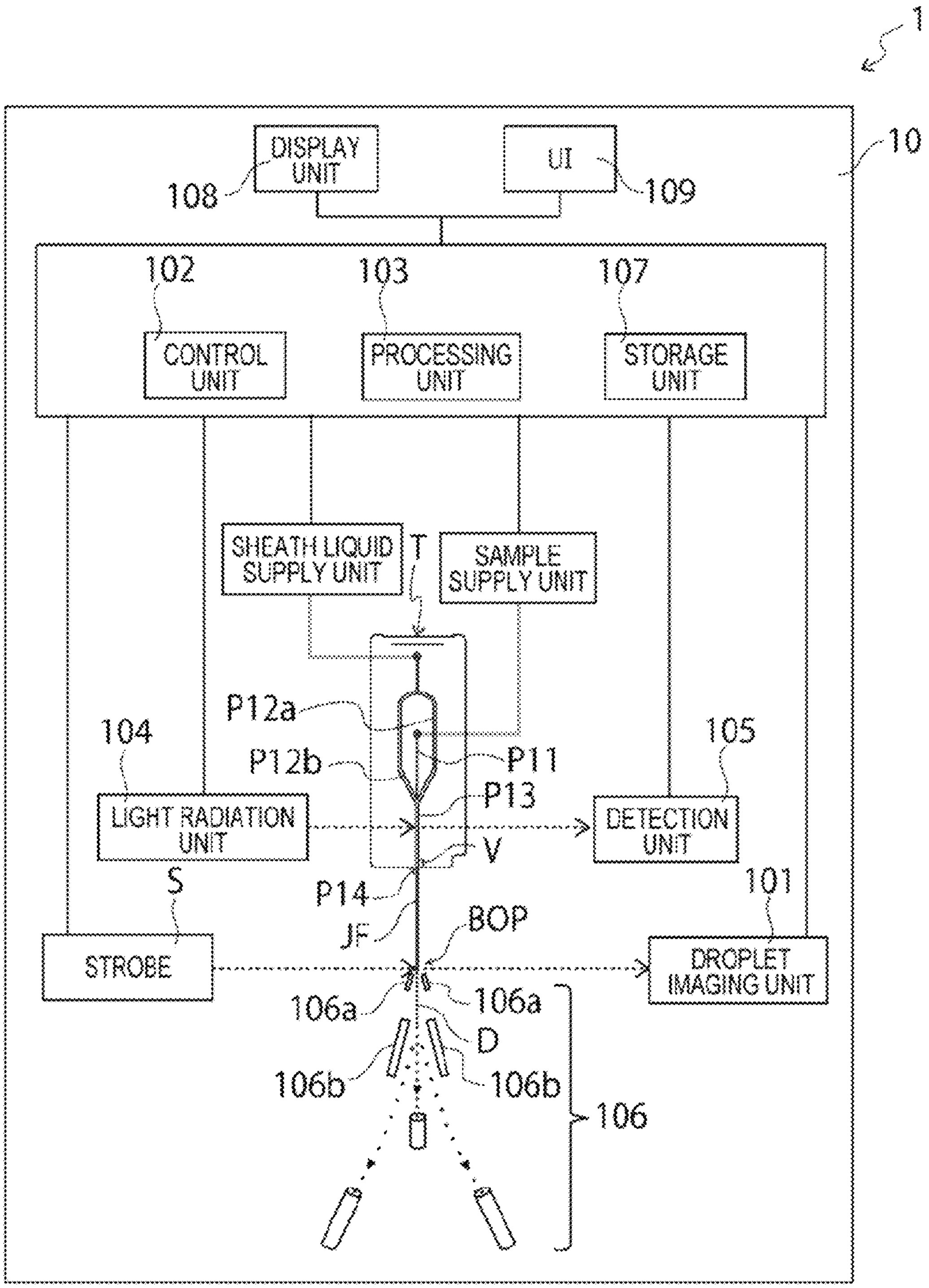
FIG. 1 is a schematic conceptual diagram schematically illustrating a first embodiment of a droplet sorting system 1 according to the present technology.
Figure 2:
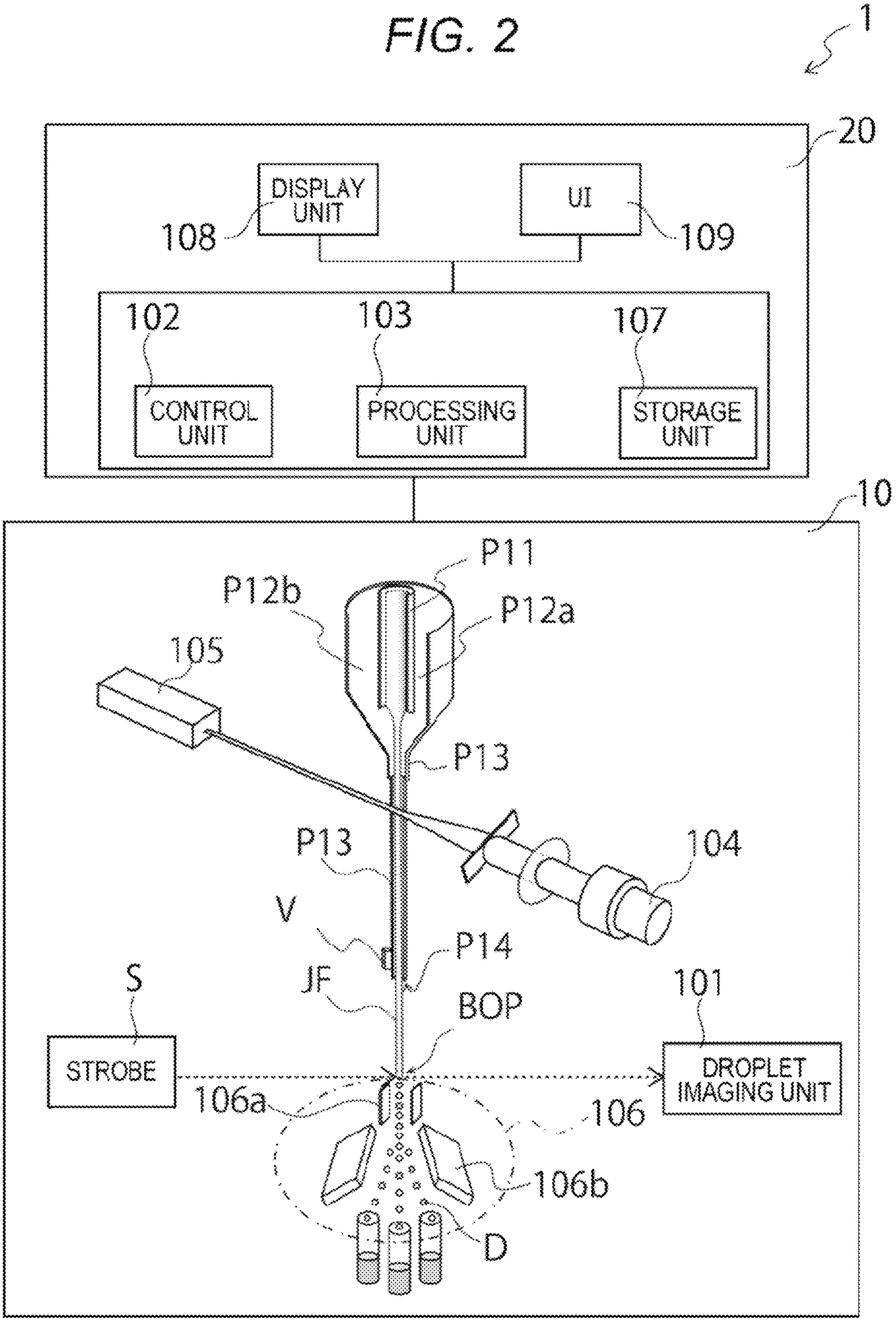
FIG. 2 is a schematic conceptual diagram schematically illustrating a second embodiment of the droplet sorting system 1 according to the present technology.

FIG. 1 is a schematic conceptual diagram schematically illustrating a first embodiment of a droplet sorting system 1 according to the present technology. FIG. 2 is a schematic conceptual diagram schematically illustrating a second embodiment of the droplet sorting system 1 according to the present technology. The droplet sorting system 1 according to the present technology includes at least a droplet imaging unit 101, a vibration element V, and a control unit 102. Furthermore, a flow path P (P11 to P13), a light radiation unit 104, a detection unit 105, a processing unit 103, a sorting unit 106, a storage unit 107, a display unit 108, a user interface 109, and the like may be provided as necessary. Details of each unit will be described hereinafter.

Note that the control unit 102, the processing unit 103, the storage unit 107, the display unit 108, the user interface 109, and the like may be provided in a device 10 that sorts particles as in the first embodiment illustrated in FIG. 1, or, as in the second embodiment illustrated in FIG. 2, the droplet sorting system 1 may include the droplet sorting device 10 including the light radiation unit 104, the detection unit 105, the vibration element V, and the sorting unit 106, and an information processing device 20 including the control unit 102, the processing unit 103, the storage unit 107, the display unit 108, and the user interface 109.

Figure 3:
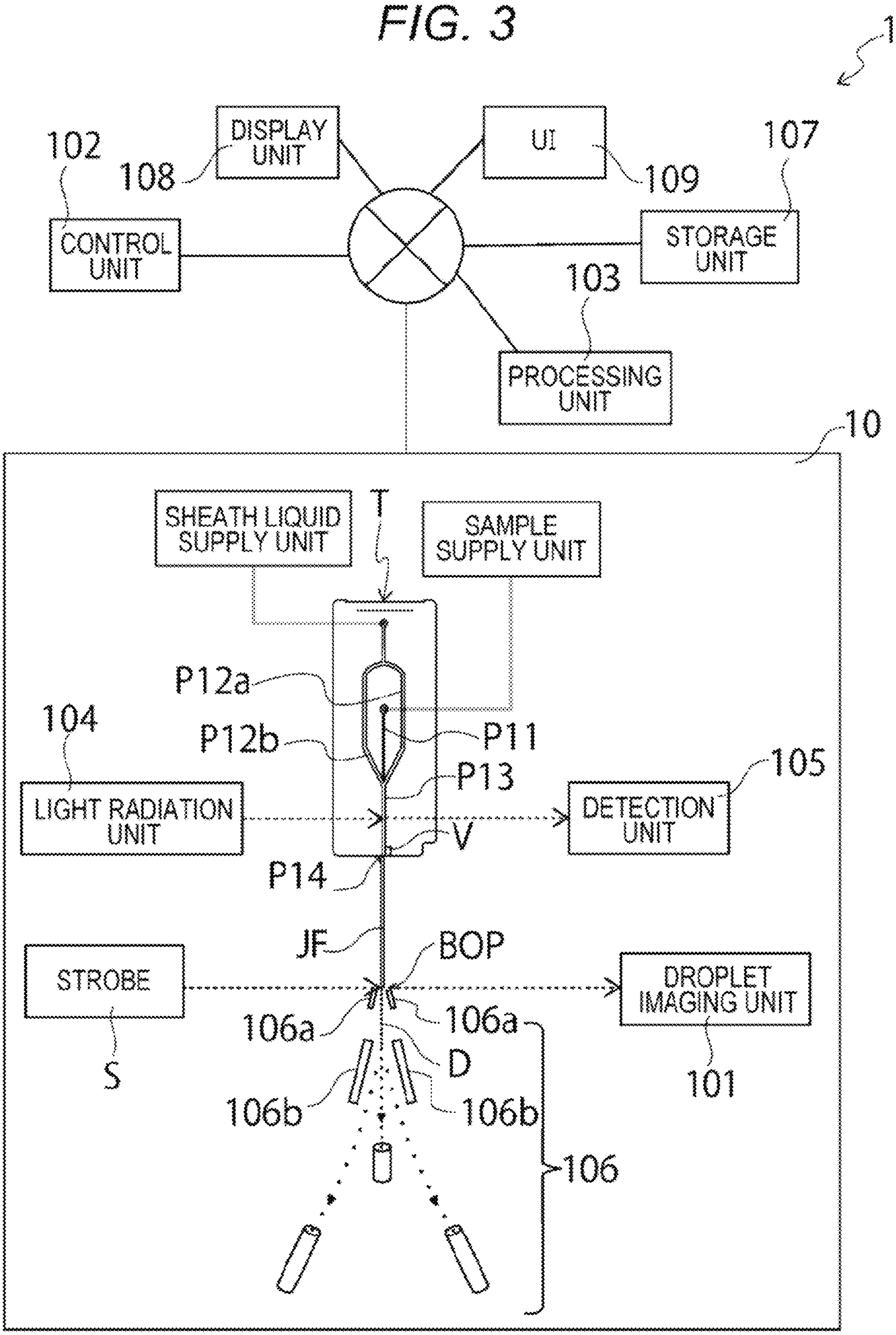
FIG. 3 is a schematic conceptual diagram schematically illustrating a third embodiment of the droplet sorting system 1 according to the present technology.

Furthermore, as in a third embodiment of the droplet sorting system 1 illustrated in FIG. 3, the control unit 102, the processing unit 103, the storage unit 107, the display unit 108, and the user interface 109 may be provided independently of one another, and can be connected to the droplet sorting system 1 over a network.

In addition, although not illustrated, the control unit 102, the processing unit 103, the storage unit 107, and the display unit 108 may be provided in a cloud environment and connected to the droplet sorting system 1 over a network. Furthermore, although not illustrated, the control unit 102, the processing unit 103, the display unit 108, and the user interface 109 may be provided in the information processing device 20, the storage unit 107 may be provided in a cloud environment, and the information processing device 20 and the storage unit 107 may be connected to the droplet sorting device 10 and the information processing device 20 over a network. In this case, records and the like of various processes in the information processing device 20 may be stored in the storage unit 107 on the cloud, and various types of information stored in the storage unit 107 may be shared by a plurality of users.

(1) Flow Path P

The droplet sorting system 1 according to the present technology can analyze and sort particles aligned in one line in a flow cell (flow path P) by detecting optical information obtained from particles.

While the flow path P may be provided in advance in the droplet sorting system 1, analysis or sorting may also be performed by installing a commercially available flow path P or a disposable chip or the like provided with a flow path P.

A form of the flow path P is not particularly limited, and may be freely designed. For example, not only the flow path P formed in a two-dimensional or three-dimensional plastic or glass substrate T as illustrated in FIGS. 1 and 3, but also the flow path P used in a conventional flow cytometer as illustrated in FIG. 2, which will be referred to later, may be used in the droplet sorting system 1.

Furthermore, a flow path width, a flow path depth, and a flow path cross-sectional shape of the flow path P are not especially limited as long as a laminar flow may be formed, and may be freely designed. For example, a micro flow path having a flow path width of 1 mm or less may also be used in the droplet sorting system 1. In particular, a micro flow path having a flow path width of 10 μm or more and 1 mm or less can be suitably used in the present technology.

A method of feeding particles is not especially limited, and the particles can flow in the flow path P depending on the form of the used flow path P. For example, a case of the flow path P formed in the substrate T illustrated in FIGS. 1 and 3 will be described. A sample liquid containing particles is introduced into a sample liquid flow path P11, and a sheath liquid is introduced into two sheath liquid flow paths P12*a* and P12*b*. The sample liquid flow path P11 and the sheath liquid flow paths P12*a* and P12*b* merge to form a main flow path P13. A sample liquid laminar flow fed in the sample liquid flow path P11 and sheath liquid laminar flows fed in the sheath liquid flow paths P12*a* and P12*b* can merge in the main flow path P13 to form a sheath flow in which the sample liquid laminar flow is sandwiched between the sheath liquid laminar flows.

The particles flowing through the flow path P widely include biological microparticles such as cells, microorganisms, and ribosomes, or synthetic particles such as latex particles, gel particles, and industrial particles, for example.

The biological microparticles include chromosomes forming various cells, ribosomes, mitochondria, organelles (cell organelles), and the like. The cells include animal cells (e.g., hemocyte cells and the like) and plant cells. The microorganisms include bacteria such as *Escherichia coli*, viruses such as tobacco mosaic virus, fungi such as yeast, and the like. Moreover, the bio-related fine particles may also include bio-related polymers such as nucleic acids, proteins, and composites of these. Furthermore, the industrial particles may be, for example, an organic or inorganic polymer material, a metal, or the like. The organic polymer material includes polystyrene, styrene/divinylbenzene, polymethyl methacrylate and the like. The inorganic polymer material includes glass, silica, a magnetic material, and the like. The metal includes gold colloid, aluminum, and the like. In general, shapes of these particles are normally spherical, but may be non-spherical in the present technology, while the size, mass, and the like thereof are also not particularly limited.

The particles that flow through the flow path P can be labeled with one or two or more dyes such as fluorescent dyes. In this case, the fluorescent dyes available in the present technology include, for example, Cascade Blue, Pacific Blue, fluorescein isothiocyanate (FITC), phycoerythrin (PE), propidium iodide (PI), Texas Red (TR), peridinin chlorophyll protein (PerCP), allophycocyanin (APC), 4',6-diamidino-2-phenylindole (DAPI), Cy3, Cy5, Cy7, Brilliant Violet (BV421) and the like.

(2) Light Radiation Unit 104

The light radiation unit 104 irradiates particles contained in a fluid with excitation light. The light radiation unit 104 may be provided with a plurality of light sources so that excitation light having different wavelengths can be irradiated. In this case, a plurality of excitation lights having different wavelengths can be emitted at different positions in the flow direction of the fluid.

The type of light emitted from the light radiation unit 104 is not particularly limited, but light having a constant light direction, wavelength, and light intensity is desirable in order to reliably generate fluorescence or scattered light from particles. A laser, an LED, and the like may be used, for example. In the case of using a laser, the type of laser is not particularly limited, and it is possible to freely combine and use one or two or more of an argon ion (Ar) laser, a helium-neon (He—Ne) laser, a dye laser, a krypton (Cr) laser, a semiconductor laser, a solid-state laser obtained by combining the semiconductor laser and a wavelength conversion optical element or the like.

(3) Detection Unit 105

The detection unit 105 detects light from particles contained in a fluid. More specifically, through radiation of excitation light, fluorescence or scattered light emitted from particles is detected and converted into an electrical signal.

In the present technology, a specific photodetection method used by a photodetector that can be used as the detection unit 105 is not particularly limited as long as light from particles can be detected, and a photodetection method used by a known photodetector can be freely selected and employed. For example, it is possible to freely combine one or two or more of the light detection methods used in a fluorescence measuring instrument, a scattered light measuring instrument, a transmitted light measuring instrument, a reflected light measuring instrument, a diffracted light measuring instrument, an ultraviolet spectroscopic measuring instrument, an infrared spectroscopic measuring instrument, a Raman spectroscopic measuring instrument, a FRET measuring instrument, a FISH measuring instrument and other various spectrum measuring instruments, a PMT array or a photodiode array in which light receiving elements such as PMTs and photodiodes are one-dimensionally arranged, those in which a plurality of independent detection channels such as two-dimensional light receiving elements such as CCD or CMOS is arranged or the like to adopt.

(4) Vibration Element V

In the droplet sorting system 1 according to the present technology, droplets containing particles are formed by the vibration element V. More specifically, in a case where fluid containing particles is ejected from an orifice P14 of the flow path P13 as a jet flow JF, a horizontal cross section of the jet flow JF is modulated in synchronization with a frequency of the vibration element V along a vertical direction by applying vibration to the entirety or a part of the main flow path P13 using the vibration element V that vibrates at a predetermined frequency, and droplets D are separated and generated at a break-off point BOP.

Note that the vibration element V used in the present technology is not particularly limited, and a vibration element V that can be used in a droplet sorting device such as a general flow cytometer can be freely selected and used. Examples include a piezo vibration element and the like. Furthermore, by adjusting the amount of liquid fed to the sample liquid flow path P11, the sheath liquid flow paths P12*a* and P12*b*, and the main flow path P13, diameter of a discharge port, a vibration frequency of the vibration element V, and the like, it is possible to adjust size of droplets D and generate the droplets D containing a constant number of particles.

Figure 4:
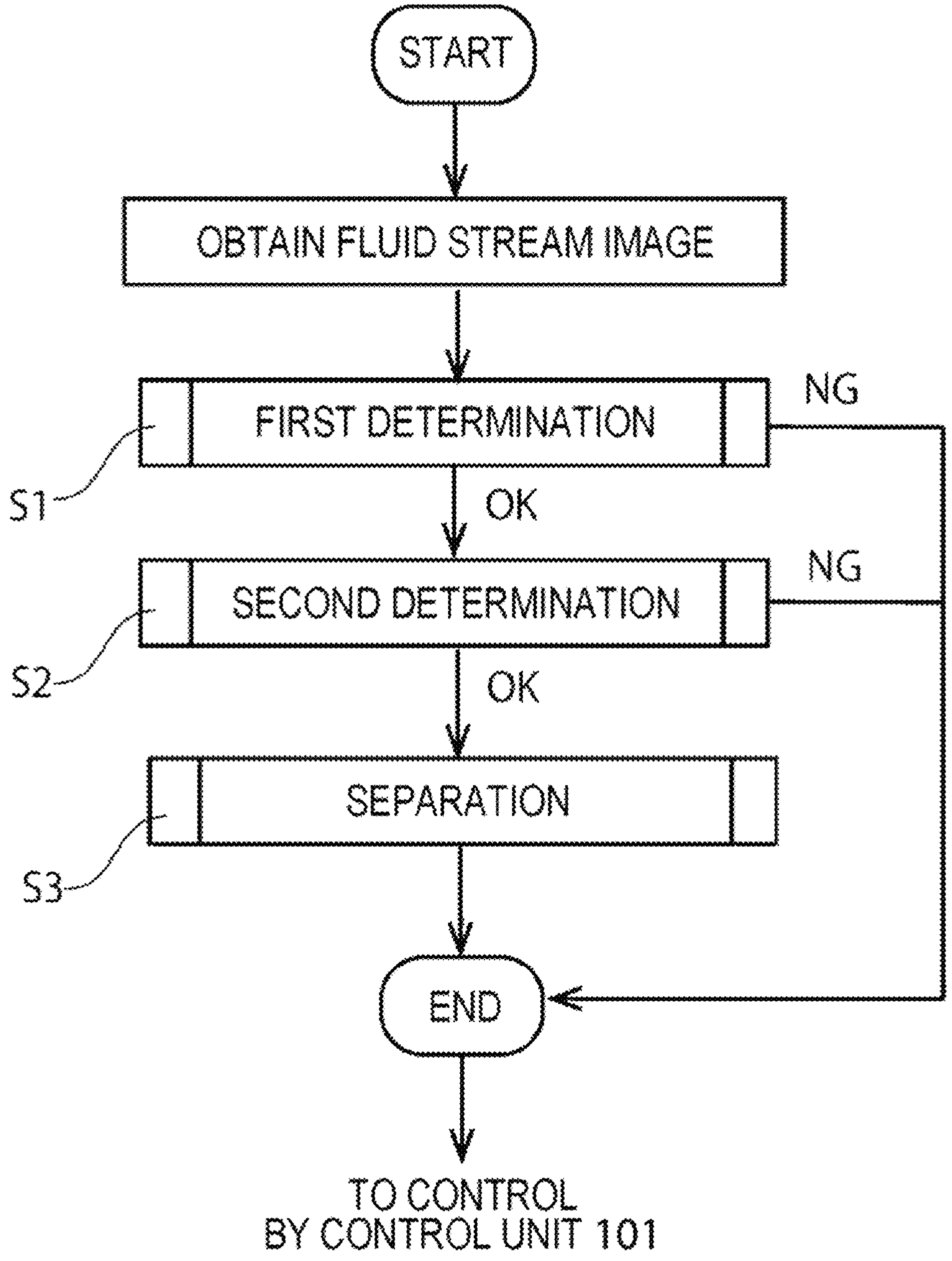
FIG. 4 is a flowchart illustrating an example of an outline of a processing method performed by a processing unit 103.

In the present technology, a position of the vibration element V is not particularly limited, and the vibration element V can be freely arranged as long as the droplets containing the particles can be formed. For example, as illustrated in FIGS. 1 to 3, the vibration element V can be arranged in the vicinity of the orifice P14 of the main flow path P13, or as illustrated in FIG. 4, the vibration element V can be arranged upstream of the flow path P to apply vibration to the entire or a part of the flow path P or the sheath flow inside the flow path P.

(5) Droplet Imaging Unit 101

The droplet imaging unit 101 images a state of a fluid stream (hereinafter also referred to as "the fluid stream") containing droplets. Furthermore, the droplet imaging unit 101 is disposed downstream of the detection unit 105.

A specific configuration of the droplet imaging unit 101 is not limited as long as it can image the state of the fluid stream. For example, the configuration is not limited to a configuration including an imaging element such as a CCD camera or a CMOS sensor, and the configuration may be a so-called line sensor or the like in which a plurality of sensors capable of detecting luminance information of light such as a light amount sensor is arranged.

The droplet imaging unit 101 is disposed at a position between the orifice P14 and a counter electrode 106*b*, which will be described later, where the state of the fluid stream can be imaged.

A fluid stream image obtained by the droplet imaging unit 101 is displayed on the display unit 108 such as a display that will be described later, and can also be used by a user to check a formation status of droplets and particle information (size, form, intervals, and the like) in the fluid stream.

As a light source for imaging the state of the fluid stream in the droplet imaging unit 101, for example, a strobe S can be used. The strobe S can also be controlled by the control unit 102, which will be described later. The strobe S can include an LED for imaging the fluid stream and a laser (for example, a red laser light source) for imaging the fluid stream, and the light source to be used can be switched in accordance with a purpose of detection by the control unit 102. The specific structure of the strobe S is not particularly limited, and one, two, or more well-known circuits or elements may be selected and freely combined.

(6) Control Unit 102

The control unit 102 specifies control parameters of the vibration element V on the basis of a state of a satellite in a fluid stream image including a droplet fused with the satellite captured by the droplet imaging unit 101.

As described above, conventionally a state of a satellite droplet is detected as in Patent Document 2, and the control parameters of the vibration element V are specified on the basis of the detected state. In actual droplet sorting, however, satellite droplets are not necessarily present, and in a case where satellite droplets are not present, that is, in a case where satellites are fused with droplets, the control parameters of the vibration element V cannot be specified on the basis of the satellites. In the present technology, on the other hand, a state of a satellite is extracted from a droplet image fused with the satellite, and the control parameters of the vibration element V can be specified on the basis of the extracted state.

A state of a satellite can be extracted by, for example, separating a satellite portion and a droplet portion from each other in a fluid stream image using the processing unit 103, which will be described later. That is, the control unit 102 can specify the control parameters of the vibration element V on the basis of a fluid stream image after being separated by the processing unit 103, which will be described later. Details of the separation performed by the processing unit 103 will be described later.

The control unit 102 specifies the control parameters of the vibration element V on the basis of the extracted state of the satellite. The control parameters of the vibration element V include the frequency, amplitude, and intensity of the drive voltage of the vibration element V, for example. The control unit 102 can specify one or more control parameters of the vibration element V.

A state of a satellite is, for example, positional information regarding the satellite. More specifically, it is possible to automatically control one or more control parameters selected from frequency, amplitude, and intensity of a drive voltage supplied to the vibration element V by determining whether a satellite is a first satellite or a slow satellite and executing a programmed control algorithm on the basis of a result of the determination.

Note that the control parameters of the vibration element V based on a state of a satellite can be specified by, for example, the method described in Patent Document 2 described above.

(7) Processing Unit 103

The processing unit 103 separates a satellite portion and a droplet portion from each other in a fluid stream image including a droplet fused with a satellite captured by the droplet imaging unit 101. Details of processing performed by the processing unit 103 will be described in detail hereinafter with reference to the drawings.

FIG. 4 is a flowchart illustrating an example of an outline of a processing method performed by the processing unit 103. The processing unit 103 can perform a first determination S1, a second determination S2, and separation S3. The processing is performed as necessary. For example, if "NG" is determined in the first determination S1, the second determination S2 and the separation S3 are not performed, and the process proceeds to control by the control unit 102. If "OK" is determined in the first determination S1 and "OK" is also determined in the second determination S2, the separation S3 is performed, the processing by the processing unit 103 ends, and the process proceeds to the control by the control unit 102.

Furthermore, if "NG" is determined in the second determination S2, for example, the separation S3 is not performed, and the process proceeds to the control by the control unit 102. At this time, as will be described later, the first determination S1 is not essential, and settings can be made in advance in accordance with specifications of the droplet sorting device 10, size of the orifice P14, and the like, or the user himself/herself can make a determination similar to the first determination S1.

Furthermore, the second determination S2 is also not essential, and the processing unit 103 can perform the separation S3 in a case where the user himself/herself performs the second determination S2 and determines "OK" as a result. After the separation S3 is performed, the processing by the processing unit 103 ends, and the process proceeds to the control by the control unit 102.

The first determination S1 and the second determination S2 can be performed a plurality of times while changing respective criteria as necessary. For example, as in the flowchart of FIG. 5, after the first determination S1 and the second determination S2 are performed for a first time, the first determination S1 and the second determination S2 may be performed again.

Figure 5:
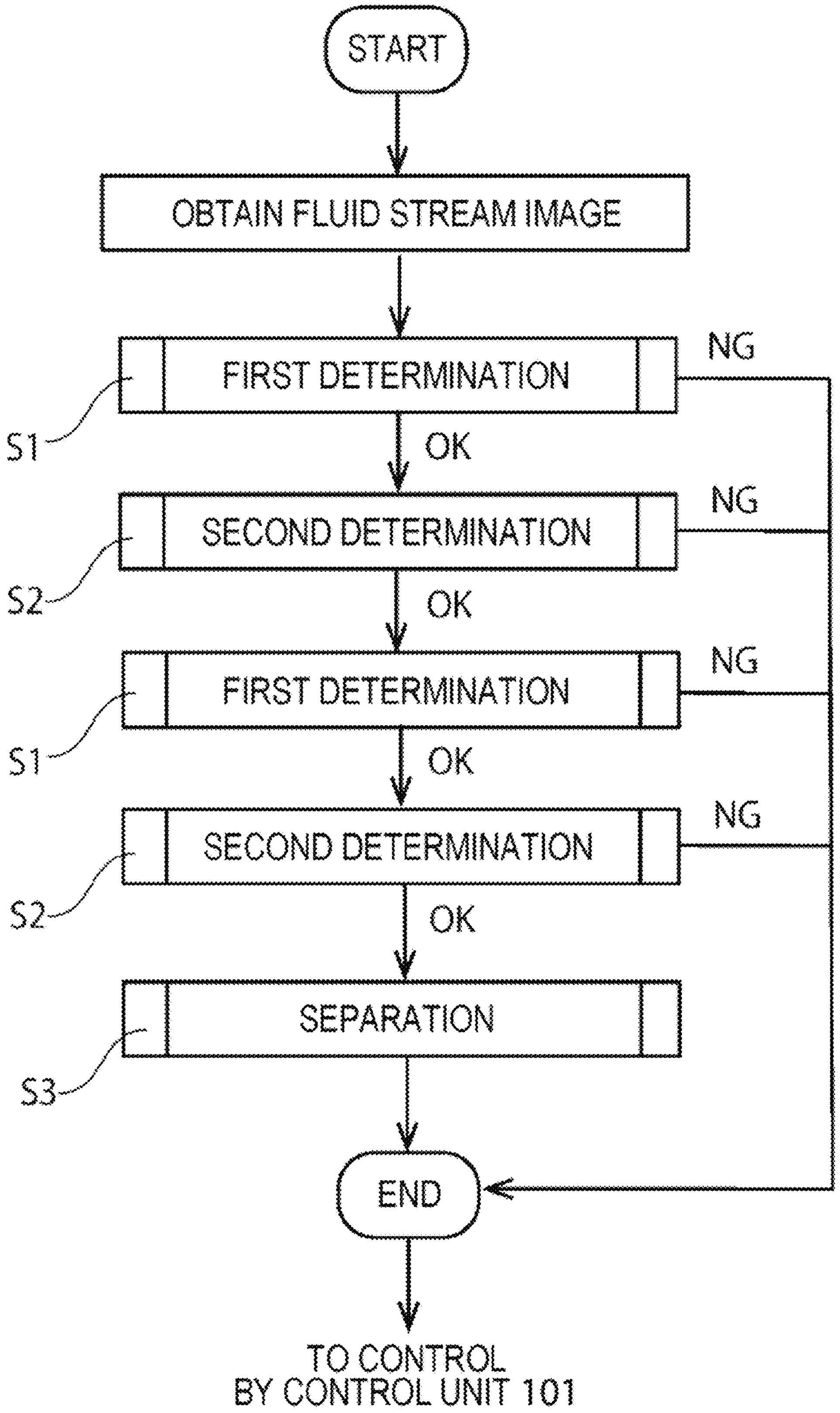
FIG. 5 is a flowchart illustrating another example of the outline of the processing method performed by the processing unit 103 different from FIG. 4.
Figure 6:
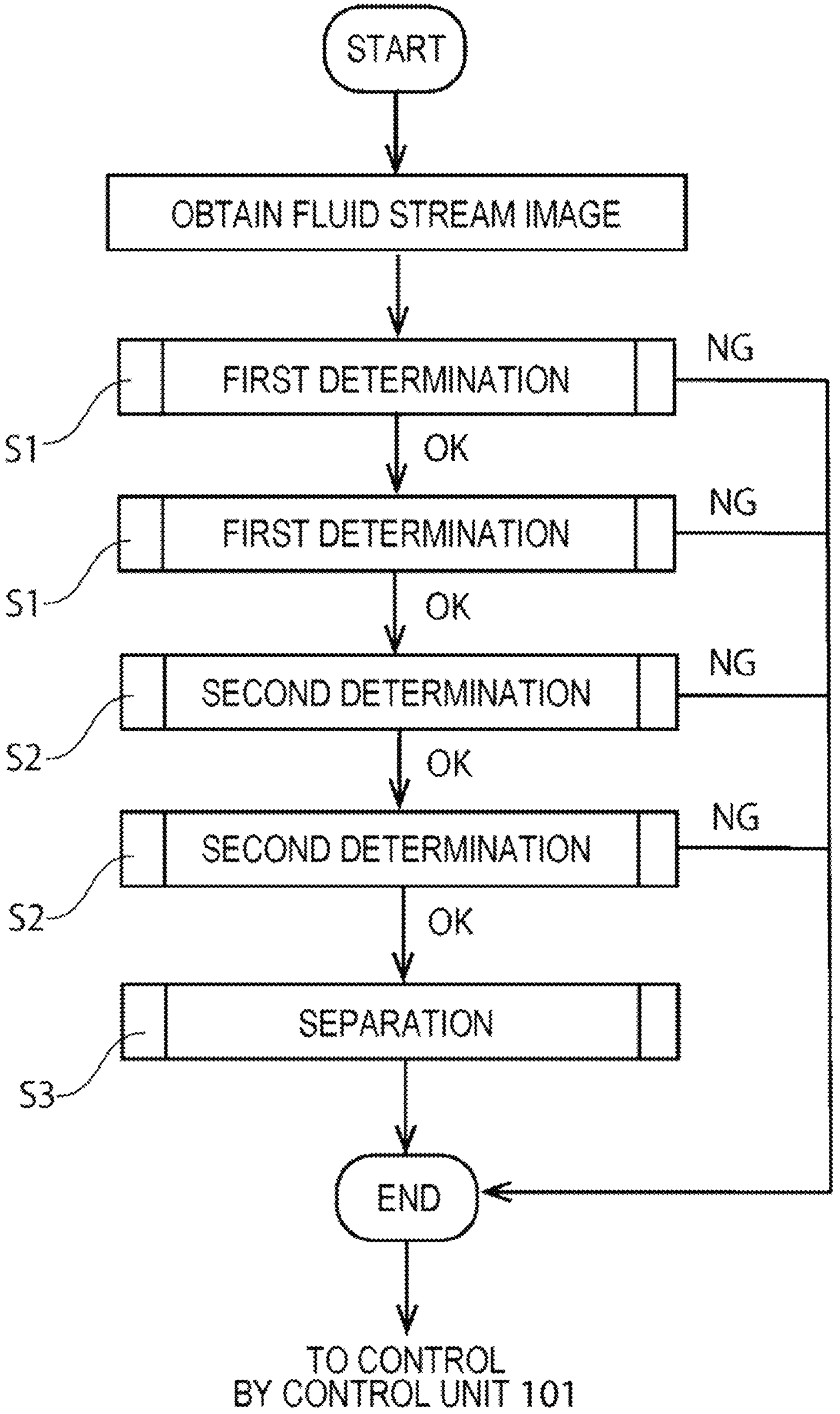
FIG. 6 is a flowchart illustrating another example of the outline of the processing method performed by the processing unit 103 different from FIGS. 4 and 5.

In a case where the first determination S1 and the second determination S2 are performed a plurality of times, it is not necessary to alternately perform the first determination S1 and the second determination S2 as illustrated in FIG. 5. For example, as illustrated in FIG. 6, after the first determination S1 is performed twice, the second determination S2 may be performed twice.

Furthermore, the number of times of the first determination S1 and the second determination S2 need not be the same. For example, although not illustrated, the first determination S1 may be performed only once, and the second determination S2 may be freely performed a plurality of times, for example, using a different criterion. Each type of processing will be described in detail hereinafter.

(7-1) First Determination S1

In the first determination S1, it is determined whether or not to perform the separation S3 on the basis of a preset threshold. More specifically, in the first determination S1, it is determined whether or not to perform the separation S3 on the basis of a threshold set in advance in accordance with the specifications of the droplet sorting device 10, a threshold determined at a time of design evaluation of the droplet sorting device 10, a threshold set in advance in accordance with the size or the like of the orifice P14 of the used flow path P, or the like.

At this time, the threshold may be a threshold related to one or more selected from width, height, and a center of gravity of a droplet.

(7-2) Second Determination S2

In the second determination S2, it is determined whether or not the separation S3 is possible on the basis of a state parameter of a droplet calculated from a fluid stream image captured by the droplet imaging unit 101. More specifically, in the second determination S2, in a case where the state parameter of the droplet calculated from the fluid stream image captured by the droplet imaging unit 101 is within a predetermined range, it is determined that the droplet can be separated, and if the state parameter is out of the predetermined range, it is determined that the droplet cannot be separated.

Examples of the state parameter of the droplet include a ratio between the width and the height of the droplet, a position of a center of gravity with respect to the height of the droplet, and a position where the width of the droplet is a specific width with respect to the height of the droplet. The processing unit 103 determines whether or not the separation S3 is possible on the basis of one, two, or more of these state parameters.

[Ratio Between Width and Height of Droplet]

Figure 7:
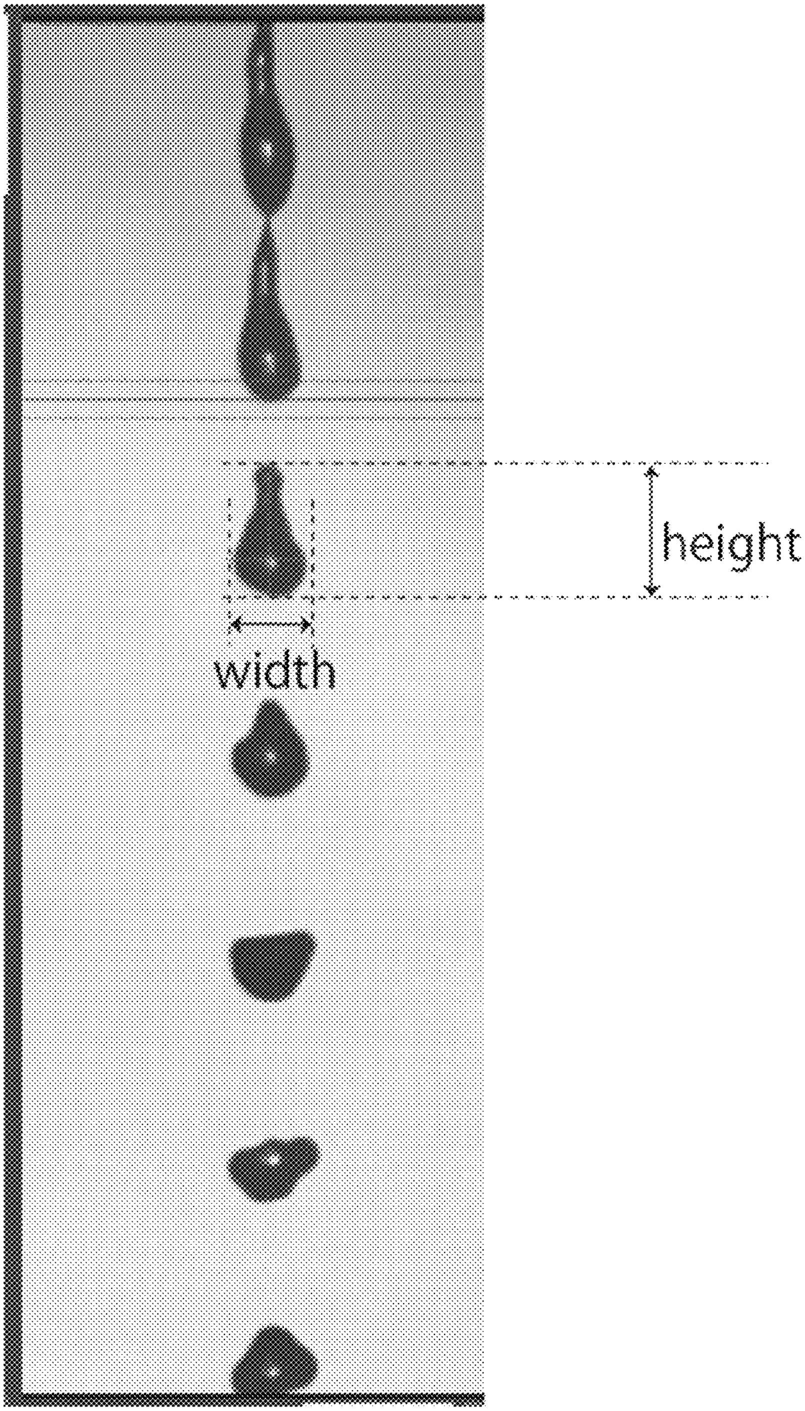
FIG. 7 is a drawing-substitute photograph illustrating an example of a fluid stream image captured by a droplet imaging unit 101.

FIG. 7 illustrates an example of a fluid stream image captured by the droplet imaging unit 101, and is a drawing-substitute photograph for describing a method of calculating a ratio between width and height of a droplet. In the example illustrated in FIG. 7, a droplet is a vertically long droplet where width<height, for example, but although not illustrated, a droplet is a horizontally long droplet in a case where width>height, and a droplet is a true circular droplet in a case where width=height.

The ratio (%) between the width and the height of a droplet can be calculated by the following expression.

$$\text{Ratio (\%)} = (\text{width/height}) \times 100$$

In the case of a vertically long droplet, for example, since a value of the ratio (%) is 1 to 99, if the predetermined range is set to 1 to 99 and the second determination S2 based on the ratio between the width and the height of the droplet is performed, it can be determined that the separation S3 is possible only in the case of a vertically long droplet.

[Position of Center of Gravity with Respect to Height of Droplet]

Figure 8:
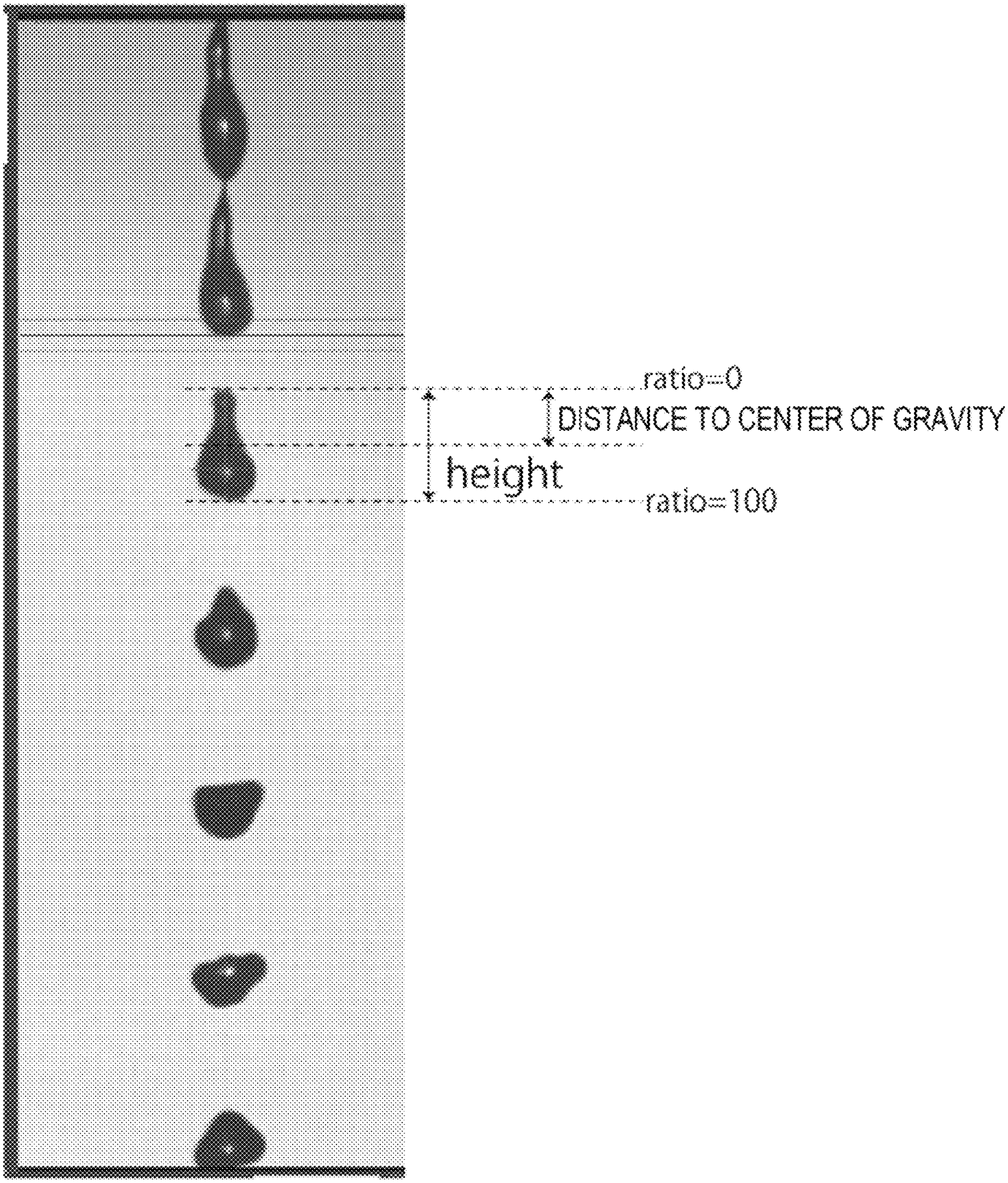
FIG. 8 illustrates an example of a fluid stream image captured by the droplet imaging unit 101, and is a drawing-substitute photograph for describing a method for calculating a ratio of a position of a center of gravity to height of a droplet.

FIG. 8 illustrates an example of a fluid stream image captured by the droplet imaging unit 101, and is a drawing-substitute photograph for describing a method for calculating a ratio of a position of a center of gravity to height of a droplet. The ratio (%) of the position of the center of gravity to the height of the droplet can be calculated by the following expression.

$$\text{Ratio (\%) of position of center of gravity} = (\text{distance to center of gravity/height}) \times 100$$

If the ratio (%) of the position of the center of gravity is 0%, for example, the droplet has the center of gravity at a top (upstream side) thereof. If the ratio (%) is 100%, the droplet has the center of gravity at a bottom (downstream side) thereof. If the ratio (%) is 50%, the droplet has the center of gravity at the center thereof with respect to the height.

For example, in the case of a droplet whose position of the center of gravity is on a lower side (downstream side) than the center, the value of the ratio (%) of the position of the center of gravity is 1 to 49. If the predetermined range is set to 1 to 49 and the second determination S2 based on the position of the center of gravity with respect to the height of the droplet is performed, therefore, it is possible to determine that the separation S3 is possible only in the case of a droplet whose position of the center of gravity is on the lower side (downstream side) than the center.

[Position where Width of Droplet Becomes Specific Width with Respect to Height of Droplet]

Figure 9:
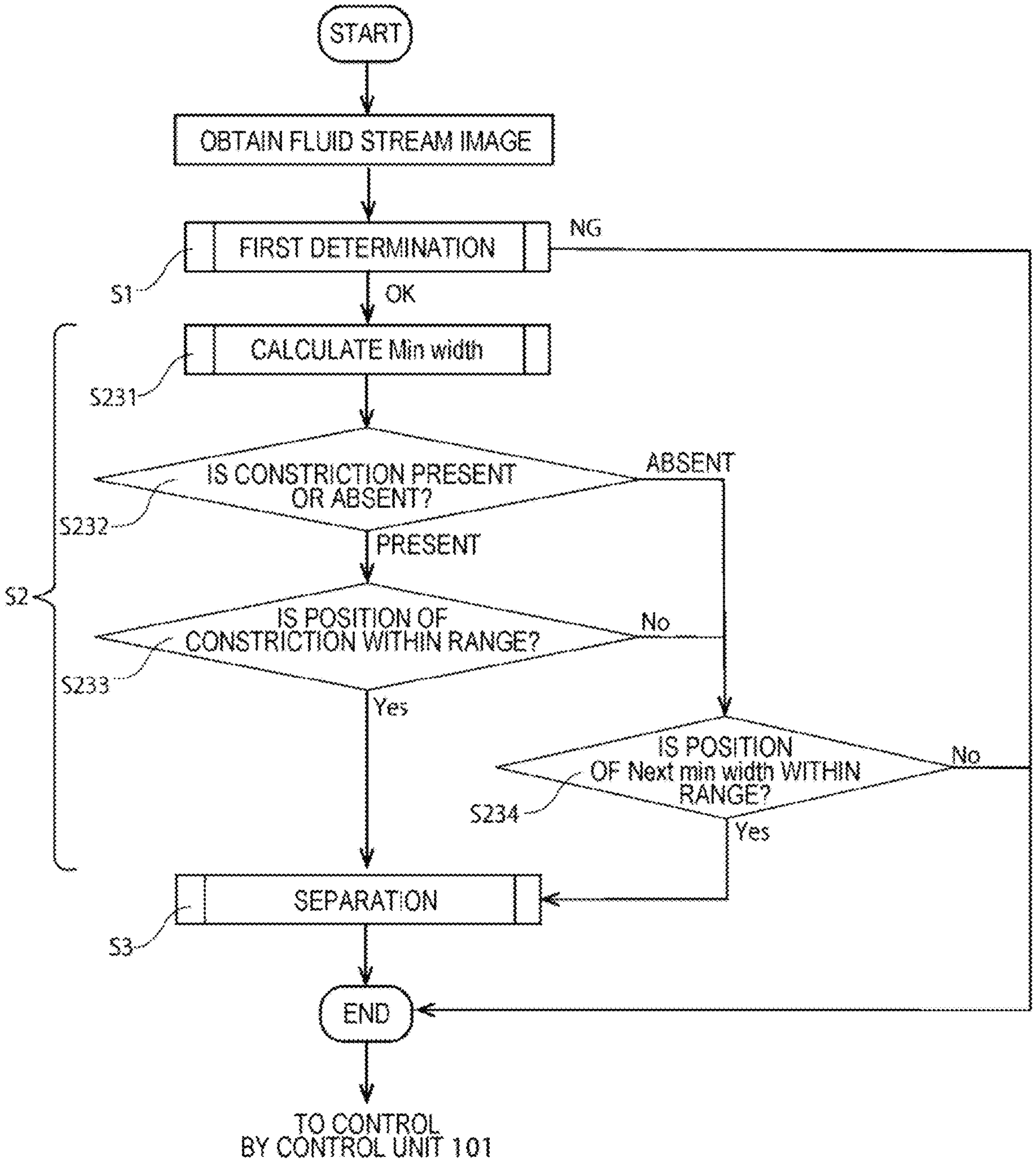
FIG. 9 is an example of a flowchart of a second determination S2 in a case where a position where width of a droplet is a specific width with respect to height of the droplet is used as a state parameter of the droplet.

FIG. 9 is an example of a flowchart of the second determination S2 in a case where a position where the width of a droplet is a specific width with respect to the height of the droplet is used as the state parameter of the droplet.

(a) Calculation of Minimum Value of Width of Droplet S231

First, the processing unit 103 calculates a minimum value (min width) of the width of the droplet. The minimum value (min width) of the width of the droplet can be calculated by scanning a fluid stream image from a downstream side (lower side).

(b) Check of Presence or Absence of Constriction of Droplet S232

By calculating the minimum value of the width of the droplet, it is possible to check whether or not there is a constriction in which the width of the droplet is narrowed. For example, as in an example of a droplet image illustrated in FIG. 10, the fluid stream image is scanned from the downstream side (lower side), and if there is a portion where the width of the droplet expands again after becoming minimum and the minimum width is smaller than or equal to a predetermined width, a constriction is present in the droplet. The predetermined width in this case may be defined by a specific numerical value, or may be defined by a ratio with respect to the maximum width of the droplet. More specifically, for example, if there is a portion where the width of the droplet increases again after becoming minimum and the width of the portion is XX % or less with respect to the maximum width of the droplet, it can be determined that a constriction is "present".

(c) Check of Position of Constriction of Droplet S233

If it is determined that there is a constriction in the droplet in the check of presence or absence of a constriction of the droplet S232, a position of the constriction is checked (S233). More specifically, the fluid stream image is scanned from the upstream side, and if a position where the width of the droplet becomes minimum, that is, the constriction, is within a predetermined range with respect to the height of the droplet, it can be determined that separation is possible. For example, the height of the droplet is obtained from the fluid stream image, a predetermined position is calculated using the following expression, and the calculated position is compared with the position of the constriction to make the determination.

$$\text{Predetermined width} = \text{droplet height} \times \text{threshold (\%) of width with respect to droplet height/100)}$$

Figure 10:
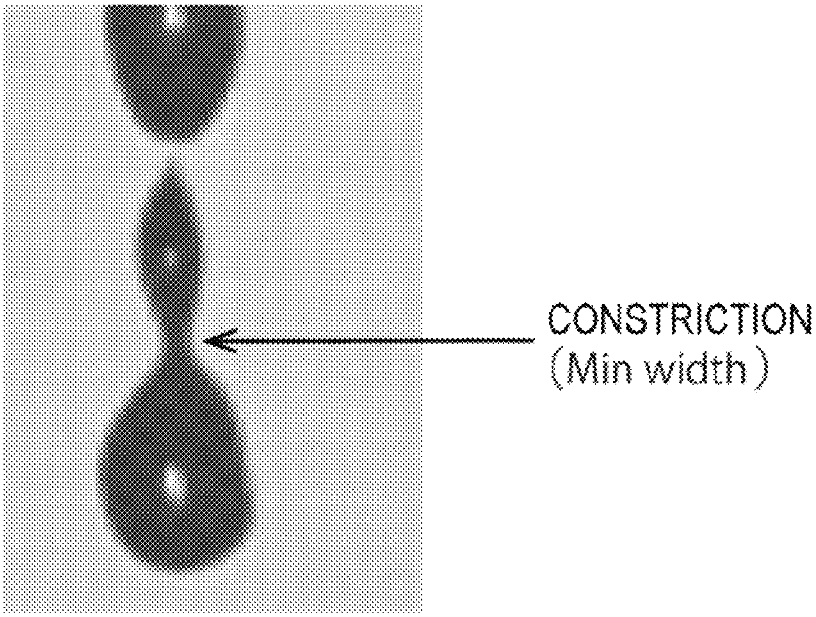
FIG. 10 is a drawing-substitute photograph illustrating an example of a droplet image captured by the droplet imaging unit 101.

For example, in a case where the threshold of the position with respect to the height of the droplet is set to XX % and, as in the example of the droplet image illustrated in FIG. 10, a constriction is clearly present in the droplet and, as a result of scanning of the droplet from an upstream side, the position of the constriction is located on a downstream side of XX % with respect to the height of the droplet, it can be estimated that a portion above the constriction is a portion corresponding to a satellite, and in the separation S3 described later, separation can be performed at the constriction. In this case, it is determined that separation is possible in the check of the position of the constriction of the droplet S233, and the process proceeds to the separation S3 described later.

Figure 11:
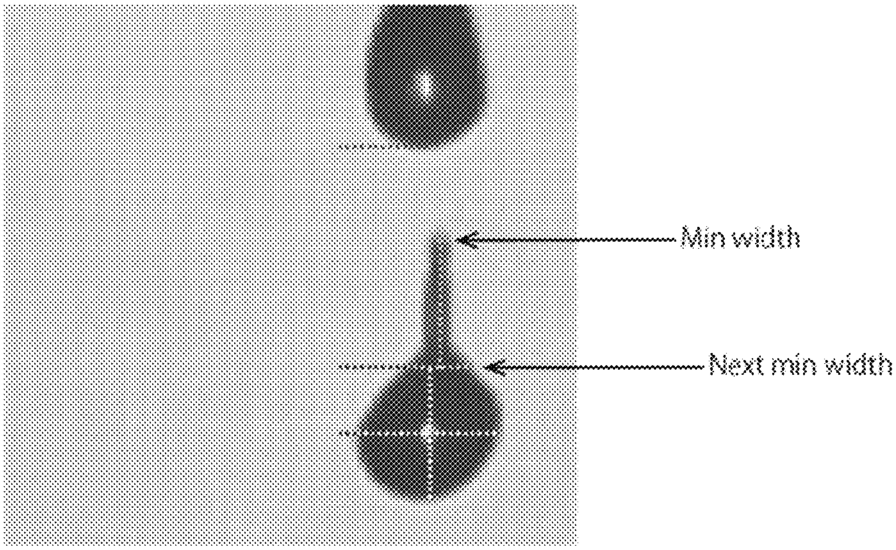
FIG. 11 is a drawing-substitute photograph illustrating another example of the droplet image captured by the droplet imaging unit 101 different from FIG. 10.

If, for example, the constriction of the droplet is not clear and the position where the width of the droplet is minimum (min width) is too high as in an example of a droplet image illustrated in FIG. 11, on the other hand, there is a possibility that, in a case where the droplet is separated at the position where the width of the droplet is minimum, the droplet is separated on an upstream side of a position where the droplet should be separated. If the control unit 102 specifies the control parameters of the vibration element V on the basis of information regarding a satellite portion separated on an upstream side of a position where the droplet should be separated, control accuracy might decrease. In this case, therefore, the process proceeds to a check of a position where the width of a next droplet is a specific width with respect to a maximum width S234.

(d) Check of Position where Width of Droplet is Specific Width with Respect to Maximum Width S234

If a position where the width of the droplet is minimum, that is, the constriction, is out of the predetermined range with respect to the height of the droplet in the check of the position of the constriction of the droplet S233, a position where the width of the droplet becomes a specific width (for example, n % or the like with respect to the maximum width;

hereinafter referred to as "next min width") with respect to the maximum width is checked (S234).

For example, the width of the droplet is obtained from the fluid stream image, and the predetermined width is calculated using the following expression.

$$\text{Predetermined width} = \text{width of droplet} \times (\text{threshold (\%) of width with respect to maximum width of droplet}/100)$$

Next, the height of the droplet is obtained from the fluid stream image, the predetermined position is calculated using a similar expression to that in the check of the position of the constriction of the droplet S233, and the calculated position is compared with a position having the predetermined width (next min width) to make a determination.

For example, in a case where the threshold of the position with respect to the height of the droplet is set to XX % and, as a result of scanning of the fluid stream image from the downstream side, the position where the width of the droplet is the specific width (next min width) with respect to the maximum width is located on a downstream side of XX % with respect to the height of the droplet, it can be determined that the droplet can be separated.

More specifically, for example, as in the example of the droplet image illustrated in FIG. 11, in a case where the constriction of the droplet is not clear and the position where the width of the droplet is minimum (min width) is too high, separation cannot be performed at the position where the width of the droplet is minimum, but by separating the droplet at a portion where the width of the droplet is the specific width (next min width) with respect to the maximum width, it is possible to separate a portion estimated to correspond to a satellite and a droplet portion from each other. In this case, it is determined that the droplet can be separated in the check of the position where the width of the droplet is the specific width with respect to the maximum width S234, and the process proceeds to the separation S3 described later.

Figure 12:
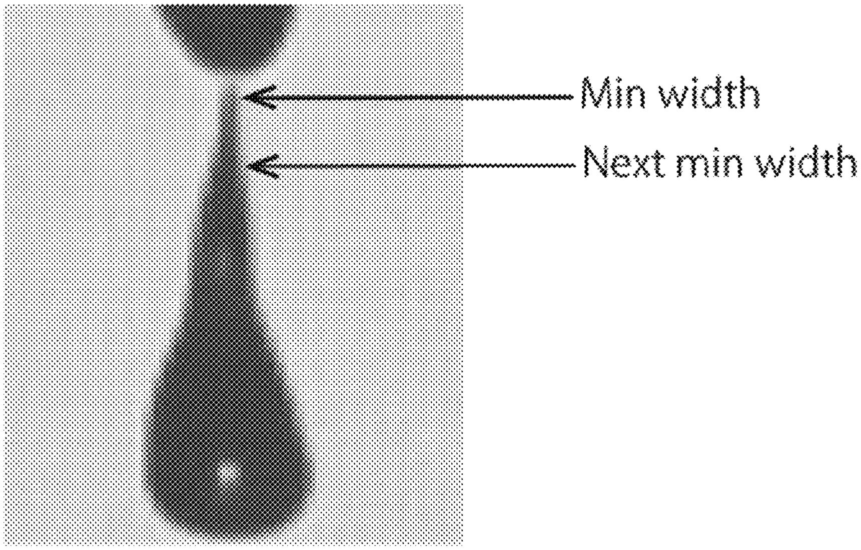
FIG. 12 is a drawing-substitute photograph illustrating another example of the droplet image captured by the droplet imaging unit 101 different from FIGS. 10 and 11.

If, for example, the constriction of the droplet is not clear, the position where the width of the droplet is minimum (min width) is too high, and the position where the width of the droplet is the specific width (next min width) with respect to the maximum width is also too high as in the example of the droplet image illustrated in FIG. 12, on the other hand, there is a possibility that separation is performed on an upstream side of a position where separation should be performed in a case where the separation is performed at the position of the next min width. If the control unit 102 specifies the control parameters of the vibration element V on the basis of information regarding a satellite portion separated on an upstream side of a position where the droplet should be separated, control accuracy might decrease. In this case, therefore, it is determined that the droplet cannot be separated in the check of the position where the width of the droplet is the specific width with respect to the maximum width S234, the processing by the processing unit 103 ends without performing the separation S3, and the process proceeds to the control by the control unit 102.

(7-3) Separation S3

In the separation S3, a satellite portion and a droplet portion are separated from each other in the fluid stream image. The satellite portion and the droplet portion can be separated from each other on the basis of width information regarding the droplet. More specifically, the satellite portion and the droplet portion can be separated from each other at a position having the specific width with respect to the height of the droplet. More specifically, the satellite portion and the droplet portion can be separated from each other at the position where the width of the droplet is minimum (min width) or at the position where the width of the droplet is the specific width with respect to the maximum width (next min width).

For example, if it is determined that a constriction is present in the droplet in the check of presence or absence of a constriction of the droplet S232 in the second determination S2, and it is determined that the constriction is within the predetermined range with respect to the height of the droplet in the check of the position of the constriction S233, the satellite portion and the droplet portion can be separated, in the separation S3, from each other at the constriction, that is, at the position where the width of the droplet is minimum (min width).

Furthermore, for example, if it is determined that no constriction is present in the droplet in the check of presence or absence of a constriction of the droplet S232 in the second determination S2, or if it is determined that a constriction is present in the droplet in the check of presence or absence of a constriction of the droplet S232 in the second determination S2 but it is determined that the position of the constriction is outside the predetermined range in the check of the position of the constriction of the droplet S233 and it is determined that the specific width (next min width) is within the predetermined range in the check of the position where the width of the droplet is the next min width with respect to the maximum width S234, the satellite portion and the droplet portion can be separated, in the separation S3, at the position where the width of the droplet is the specific width (next min width) with respect to the maximum width.

Figure 13:
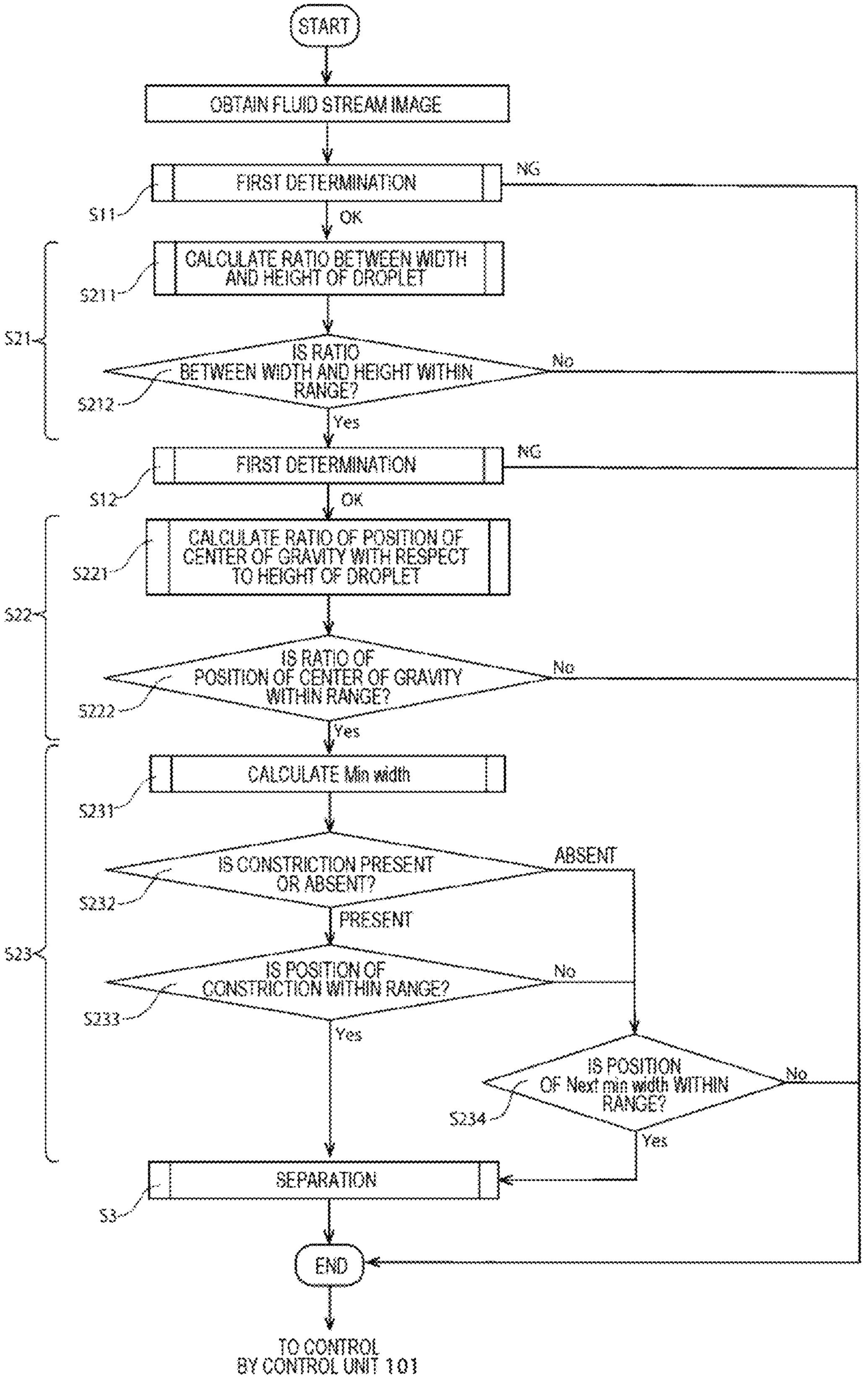
FIG. 13 is a flowchart illustrating an example of a process of the processing method performed by the processing unit 103.

A flowchart of FIG. 13 illustrates an example of a process performed by the processing unit 103 described above. In a case where the processing unit 103 obtains a fluid stream image including a droplet fused with a satellite captured by the droplet imaging unit 101, the first determination S11 is performed for a first time. In the first determination S11 performed for the first time, necessity of execution of the separation is determined on the basis of a preset threshold. If it is determined that it is not necessary to perform the separation, the second determination S2 and the separation S3 are not performed, and the process proceeds to the control by the control unit 102. If it is determined in the first determination S11 performed for the first time that the separation needs to be performed, on the other hand, the process proceeds to the second determination S21 performed for a first time.

In the second determination S21 performed for the first time, for example, the ratio between the width and the height of the droplet is calculated (S211). If the calculated ratio between the width and the height of the droplet is out of the predetermined range, the separation S3 is not performed, and the process proceeds to the control by the control unit 102. If the calculated ratio between the width and the height of the droplet is within the predetermined range, on the other hand, the process proceeds to a first determination S12 performed for a second time.

In the first determination S12 performed for the second time, necessity of execution of the separation is determined on the basis of a preset threshold. If it is determined that it is not necessary to perform the separation, a second determination S22 performed for a second time and the separation S3 are not performed, and the process proceeds to the control by the control unit 102. If it is determined in the first determination S12 performed for the second time that the separation needs to be performed, on the other hand, the process proceeds to the second determination S22 performed for the second time.

In the second determination S22 performed for the second time, for example, the ratio of the position of the center of gravity to the height of the droplet is calculated (S221). If the calculated ratio of the position of the center of gravity is out of the predetermined range, the separation S3 is not performed, and the process proceeds to the control by the control unit 102. If the calculated ratio of the position of the center of gravity is within the predetermined range, on the other hand, the process proceeds to calculation of the minimum value (min width) of the width of the droplet S231.

Next, it is checked whether or not a constriction is present in the droplet (S232). If a constriction is present in the droplet, it is checked whether a position of the constriction is within the predetermined range (S233). If the position of the constriction is within the predetermined range, the process proceeds to the separation S3, and the satellite portion and the droplet portion are separated from each other at the constriction, that is, at the position where the width of the droplet is minimum (min width).

If the position of the constriction is out of the predetermined range or if a constriction is not present in the droplet in S232, the check of the position where the width of the droplet is the specific width (next min width) with respect to the maximum width S234 is performed. If it is determined that the specific width (next min width) is within the predetermined range in the check of the position where the width of the droplet is the next min width with respect to the maximum width S234, the process proceeds to the separation S3, and the satellite portion and the droplet portion are separated from each other at the position where the width of the droplet is the specific width (next min width) with respect to the maximum width.

If it is determined that the specific width (next min width) is out of the predetermined range in the check of the position where the width of the droplet is the next min width with respect to the maximum width S324, the processing by the processing unit 103 ends without performing the separation S3, and the process proceeds to the control by the control unit 102.

(8) Sorting Unit 106

The sorting unit 106 sorts a droplet D containing the particles formed by the vibration element V. More specifically, the droplet D is charged with positive or negative charge on the basis of an analysis result of size, form, internal structure, and the like of the particles analyzed from an optical signal detected by the detection unit 105 (see reference numeral 106*a*). The counter electrode 106*b* to which a voltage is applied then sorts the charged droplet D by changing a course of the droplet D in a desired direction.

Figure 14:
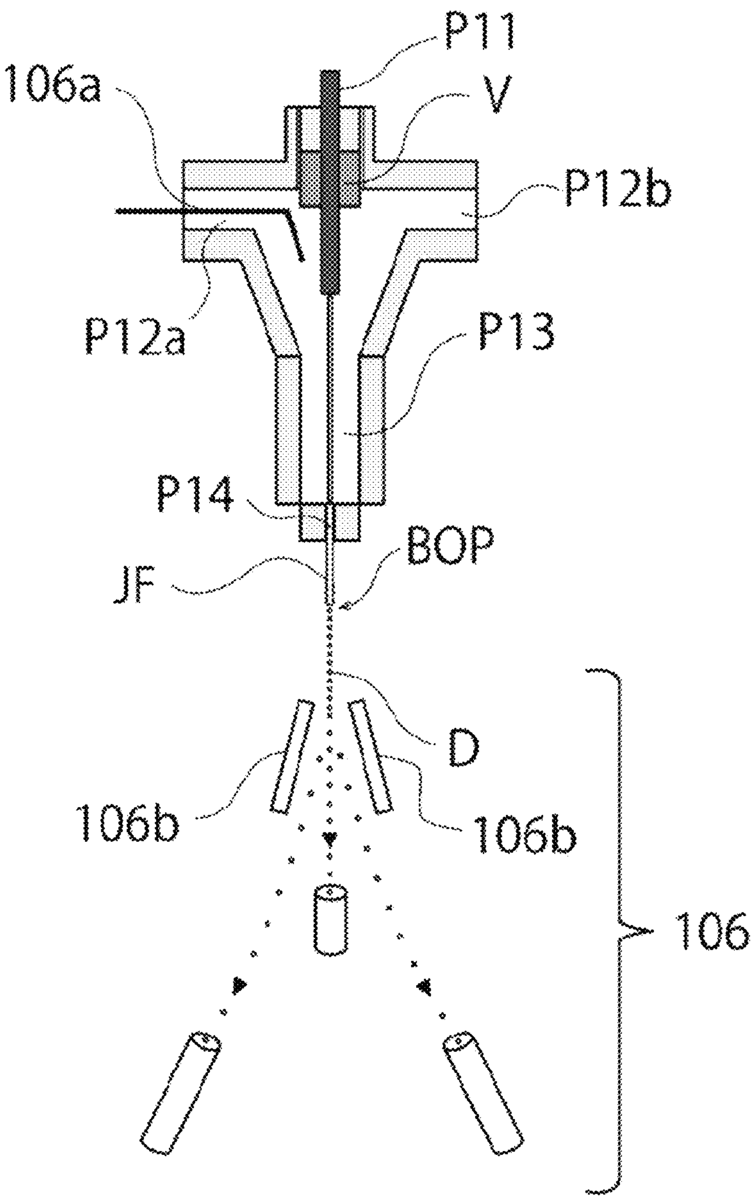
FIG. 14 is a schematic conceptual diagram illustrating an installation example of a vibration element V and a charging unit 106*a*.

In the present technology, the position of a charging unit 106*a* is not particularly limited, and can be freely arranged as long as the droplet D including the particles can be charged. For example, as illustrated in FIGS. 1 to 3, the droplet D can be directly charged at the downstream of the break-off point BOP, or as illustrated in FIG. 14, the charging unit 105*a* including an electrode or the like can be arranged in the sheath liquid flow path P12*a* or P12*b* or the like, and the droplet D containing target particles can be charged via the sheath liquid immediately before the formation of the droplet D.

(9) Storage Unit 107

The droplet sorting system 1 according to the present technology may include the storage unit 107 that stores various types of data. The storage unit 107 can store all data related to particle detection and droplet sorting such as, for example, imaging data obtained by the droplet imaging unit 101, optical signal data from particles detected by the detection unit 105, control data controlled by the control unit 102, processing data processed by the processing unit 103, particle sorting data sorted by the sorting unit 106, and the like.

Furthermore, as described above, in the present technology, since the storage unit 107 may be provided in the cloud environment, it is also possible for each user to share the various types of information stored in the storage unit 107 on the cloud over a network.

Note that, in the present technology, the storage unit 107 is not essential, and it is also possible to store the various types of data using an external storage device or the like.

(10) Display Unit 108

The droplet sorting system 1 according to the present technology may include the display unit 108 that displays various types of information. The display unit 108 can display all data related to particle detection and droplet sorting such as, for example, imaging data obtained by the droplet imaging unit 101, optical signal data from particles detected by the detection unit 105, control data controlled by the control unit 102, processing data processed by the processing unit 103, particle sorting data sorted by the sorting unit 106, and the like.

In the present technology, the display unit 108 is not essential, and an external display device may be connected, instead. As the display unit 108, for example, a display, a printer, or the like may be used.

(11) User Interface 109

The droplet sorting system 1 according to the present technology may include the user interface 109, which is a part operated by the user. The user may access each of the units and the devices through the user interface 109 to control the unit or the device.

In the present technology, the user interface 109 is not essential, and an external operation device may be connected, instead. As the user interface 109, for example, a mouse, a keyboard, or the like may be used.

2. Droplet Sorting Method

A droplet sorting method according to the present technology includes at least an imaging step, a droplet forming step, and a control step. Furthermore, a light radiation step, a detection step, a processing step, a sorting step, a storage step, a display step, and the like may be performed as necessary.

Note that since each step is the same as the corresponding step performed by the units of the droplet sorting system 1 according to the present technology described above, description thereof is omitted here.

3. Droplet Sorting Program

A droplet sorting program according to the present technology is a program for causing a computer to achieve at least a control function of specifying control parameters of a vibration element for forming a droplet. Furthermore, the droplet sorting program according to the present technology may be a program for causing a computer to achieve a processing function of separating a satellite portion and a droplet portion from each other in a fluid stream image.

The droplet sorting program according to the present technology may be stored in a storage medium such as a magnetic disk, an optical disc, a magneto-optical disk, or a flash memory, for example, or may be distributed over a network.

Note that since each function is the same as the corresponding function performed by the units of the droplet sorting system 1 according to the present technology described above, description thereof is omitted here.

Note that the present technology may also have the following configurations.

(1)

A droplet sorting system including:

a droplet imaging unit that images a state of a fluid stream including a droplet discharged from an orifice that generates the fluid stream;

a vibration element for forming the droplet; and a control unit that specifies a control parameter of the vibration element on the basis of a state of a satellite in a fluid stream image including a droplet fused with the satellite captured by the droplet imaging unit.

(2)

The droplet sorting system according to (1), in which the control parameter is one or more parameters selected from frequency, amplitude, and intensity of a drive voltage of the vibration element.

(3)

The droplet sorting system according to (1) or (2), further including: a processing unit that separates a satellite portion and a droplet portion from each other in the fluid stream image.

(4)

The droplet sorting system according to (3), in which the control unit specifies the control parameter of the vibration element on the basis of the fluid stream image after the separation.

(5)

The droplet sorting system according to (3) or (4), in which the separation is performed on the basis of width information regarding the droplet.

(6)

The droplet sorting system according to (5), in which the separation is performed at a position having a specific width with respect to height of the droplet.

(7)

The droplet sorting system according to (5), in which the separation is performed at a position where width of the droplet is minimum or at a position where the width of the droplet is a specific width with respect to a maximum width.

(8)

The droplet sorting system according to any one of (3) to (7), in which the processing unit performs a first determination for determining whether or not it is necessary to perform the separation on the basis of a preset threshold.

(9)

The droplet sorting system according to (8), in which the threshold is a threshold value related to one or more selected from width, height, and a center of gravity of the droplet.

(10)

The droplet sorting system according to any one of (3) to (9), in which the processing unit performs a second determination for determining whether or not the separation is possible on the basis of a state parameter of the droplet calculated from the fluid stream image captured by the droplet imaging unit.

(11)

The droplet sorting system according to (10), in which the state parameter is one or more state parameters selected from a ratio between width and height of the droplet, a position of a center of gravity with respect to the height of the droplet, and a position where the width of the droplet is a specific width with respect to the height of the droplet.

(12)

The droplet sorting system according to (11), in which the processing unit scans the fluid stream image from a downstream side and calculates a minimum value of the width of the droplet.

(13)

The droplet sorting system according to (11), in which if the state parameter is within a predetermined range in the second determination, it is determined that the separation is possible.

(14)

The droplet sorting system according to (13), in which the fluid stream image is scanned from an upstream side in the second determination, and if a position where the width of the droplet is minimum is within a predetermined range with respect to the height of the droplet, it is determined that the separation is possible.

(15)

The droplet sorting system according to (13), in which the fluid stream image is scanned from a downstream side in the second determination, and if the position where the width of the droplet is the specific width with respect to a maximum width is within a predetermined range with respect to the height of the droplet, it is determined that the separation is possible.

(16)

A droplet sorting method including:

an imaging step of imaging a state of a fluid stream including a droplet discharged from an orifice that generates the fluid stream;

a droplet forming step of forming the droplet using a vibration element; and a control step of specifying a control parameter of the vibration element on the basis of a state of a satellite in a fluid stream image fused with the satellite captured in the imaging step.

(17)

A droplet sorting program for causing a computer to achieve a control function of specifying, on the basis of a state of a satellite discharged from an orifice that generates a fluid stream including a droplet fused with the satellite, a control parameter of a vibration element for forming the droplet in a fluid stream image including a state of the fluid stream.

REFERENCE SIGNS LIST

1 Droplet sorting system
10 Droplet sorting device
20 Information processing device
P, P11, P12, P13 Flow path
P14 Orifice
101 Droplet imaging unit
102 Control unit
103 Processing unit
104 Light radiation unit
105 Detection unit
V Vibration element
106 Sorting unit

107 Storage unit
108 Display unit
109 User interface
106*a* Charging unit
106*b* Counter electrode
JF Jet flow
BOP Break-off point
D Droplet
S Strobe

The invention claimed is:

1. A droplet sorting system comprising:

a droplet imaging unit that images a state of a fluid stream including a droplet discharged from an orifice that generates the fluid stream;

a vibration element for forming the droplet;

a control unit that specifies a control parameter of the vibration element on a basis of a state of a satellite in a fluid stream image including a droplet fused with the satellite captured by the droplet imaging unit; and a processing unit that separates a satellite portion and a droplet portion from each other in the fluid stream image, wherein the processing unit performs a second determination for determining whether or not a separation is possible on a basis of a state parameter of the droplet calculated from the fluid stream image captured by the droplet imaging unit, wherein the state parameter is one or more state parameters selected from a ratio between width and height of the droplet, a position of a center of gravity with respect to the height of the droplet, and a position where the width of the droplet is a specific width with respect to the height of the droplet, wherein the processing unit scans the fluid stream image starting from a bottom side and calculates a minimum value of the width of the droplet.

2. The droplet sorting system according to claim 1, wherein the control parameter is one or more parameters selected from frequency, amplitude, and intensity of a drive voltage of the vibration element.

3. The droplet sorting system according to claim 1, wherein the control unit specifies the control parameter of the vibration element on a basis of the fluid stream image after the separation.

4. The droplet sorting system according to claim 1, wherein the separation is performed on a basis of width information regarding the droplet.

5. The droplet sorting system according to claim 4, wherein the separation is performed at a position having a specific width with respect to height of the droplet.

6. The droplet sorting system according to claim 4, wherein the separation is performed at a position where width of the droplet is minimum or at a position where the width of the droplet is a specific width with respect to a maximum width.

7. The droplet sorting system according to claim 1, wherein the processing unit performs a first determination for determining whether to perform the separation on a basis of a preset threshold.

8. The droplet sorting system according to claim 7, wherein the preset threshold is a threshold related to one or more selected from width, height, and a center of gravity of the droplet.

9. The droplet sorting system according to claim 1, wherein the state parameter being within a predetermined range in the second determination determines that the separation is possible.

10. The droplet sorting system according to claim 9, wherein the fluid stream image is scanned starting from a top side in the second determination, and a determination that the separation is possible is based on whether a position where the width of the droplet is minimum is within a predetermined range with respect to the height of the droplet.

11. The droplet sorting system according to claim 9, wherein the fluid stream image is scanned starting from a bottom side in the second determination, and a determination that the separation is possible is based on whether the position where the width of the droplet is the specific width with respect to a maximum width is within a predetermined range with respect to the height of the droplet.

12. A droplet sorting method comprising:

an imaging step of imaging a state of a fluid stream including a droplet discharged from an orifice that generates the fluid stream;

a droplet forming step of forming the droplet using a vibration element; and a control step of specifying a control parameter of the vibration element on a basis of a state of a satellite in a fluid stream image fused with the satellite captured in the imaging step;

a processing step that separates a satellite portion and a droplet portion from each other in the fluid stream image, wherein the processing step performs a second determination for determining whether or not a separation is possible on a basis of a state parameter of the droplet calculated from the fluid stream image captured by a droplet imaging unit, wherein the state parameter is one or more state parameters selected from a ratio between width and height of the droplet, a position of a center of gravity with respect to the height of the droplet, and a position where the width of the droplet is a specific width with respect to the height of the droplet, wherein the processing step scans the fluid stream image starting from a bottom side and calculates a minimum value of the width of the droplet.

13. At least one non-transitory computer readable medium storing instructions that, when executed by a computer, cause the computer to execute a process of:

an imaging step of imaging a state of a fluid stream including a droplet discharged from an orifice that generates the fluid stream;

a droplet forming step of forming the droplet using a vibration element; and a control step of specifying a control parameter of the vibration element on a basis of a state of a satellite in a fluid stream image fused with the satellite captured in the imaging step;

a processing step that separates a satellite portion and a droplet portion from each other in the fluid stream image, wherein the processing step performs a second determination for determining whether or not a separation is possible on a basis of a state parameter of the droplet calculated from the fluid stream image captured by a droplet imaging unit, wherein the state parameter is one or more state parameters selected from a ratio between width and height of the droplet, a position of a center of gravity with respect to the height of the droplet, and a position where the width of the droplet is a specific width with respect to the height of the droplet, wherein the processing step scans the fluid stream image starting from a bottom side and calculates a minimum value of the width of the droplet.

* * * * *